No. 726,140. PATENTED APR. 21, 1903.
J. CAMPBELL, Sr.
ANIMAL TRAP.
APPLICATION FILED JULY 15, 1902.
NO MODEL.

Witnesses
Geo. Ackman.
Chas. S. Hoyer.

Inventor
John Campbell, Sr.
By Victor J. Evans
Attorney

UNITED STATES PATENT OFFICE.

JOHN CAMPBELL, SR., OF WEBSTER, NEW YORK.

ANIMAL-TRAP.

SPECIFICATION forming part of Letters Patent No. 726,140, dated April 21, 1903.

Application filed July 15, 1902. Serial No. 115,708. (No model.)

*To all whom it may concern:*

Be it known that I, JOHN CAMPBELL, Sr., a citizen of the United States, residing at Webster, in the county of Monroe and State of New York, have invented new and useful Improvements in Animal-Traps, of which the following is a specification.

This invention relates to animal-traps; and the primary object of the same is to provide a simple, cheap, and effective device by means of which rats or other animals may be entrapped without actuating mechanism and when so entrapped will be unable to escape from the inclosure, and when it is desired to remove the animal from the trap a particular form of entrance-chute, which is readily detachable, is withdrawn for this purpose and afterward replaced and secured in operative position.

A further object of the invention is to provide a trap made up of separable parts which can be easily assembled and when separated capable of being nested in compact form for convenience in transportation and storage.

With these and other objects and advantages in view the invention consists in the construction and arrangement of the several parts whereby they may be easily separated or assembled and which will be more fully hereinafter described and claimed.

Figure 1:
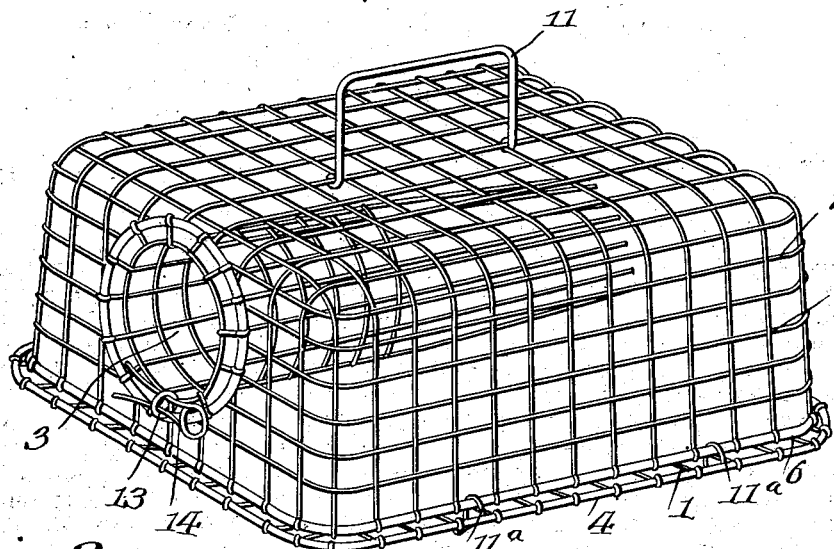
Figure 2:
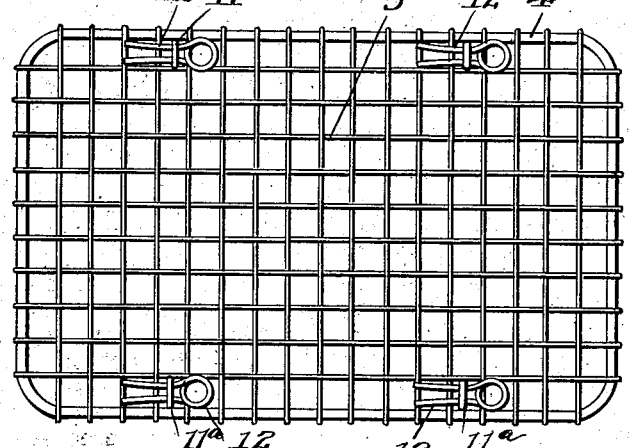
Figure 3:
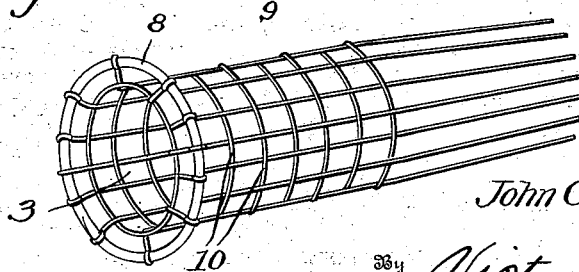

In the drawings, Figure 1 is a perspective view of a trap embodying the features of the invention and showing the parts fully assembled. Fig. 2 is a bottom plan view of the same. Fig. 3 is a detail perspective view of the entrance chute or funnel, which is readily removable from and applicable to the trap.

Similar numerals of reference are employed to indicate corresponding parts in the several views.

The trap comprises, essentially, three parts, a bottom 1, a basket or other shaped body 2, and an entrance chute or funnel 3, all of which are readily separable for convenience in nesting a number of similar parts to reduce them to compact form for transportation and storage. The bottom 1 has a stiff surrounding marginal wire 4 with the terminals of interlaced cross-wires 5 secured thereto. The basket-body 2 also has a lower surrounding base-wire 6 with interlaced wires 7, terminally attached thereto and shaped in such manner as to give the body a sufficient elevation above the base-wire 6 and bottom 1 to practically produce an inclosure. One end of the body 2 has an opening therethrough, in which is removably fitted the chute or funnel 3, the latter having an outer circular rim-wire 8 and a plurality of longitudinally-disposed body-wires 9, which are interlaced for a portion of their length by surrounding inclosing wires 10, the inner extremities of the body-wires being free and converged to reduce the opening through the chute or funnel to prevent return of the animal therethrough after he has been entrapped. It will be understood that the inner free extremities of the longitudinal wires 9 have a resilient movement, and when an animal passes between them into the body of the trap they expand, and after the animal has fully entered the trap said extremities may resume their normal position and resist the efforts of the entrapped animal to escape through the chute or funnel. To the top of the body 2 a wire grip or handle 11 is movably secured, whereby the entire trap may be transported from one place to another.

The principal feature of the present invention, as before explained, is the separable nature of the three essential parts, and at suitable intervals on the opposite sides of the body 2 rings or eyes $11^a$ are arranged on the base-wire 6 and projected through the meshes of the interlaced wires 5 close to the marginal wire 4 to receive removable spring-keys 12, which rest flatly against the under side of the bottom 1 and reliably hold the body 2 intact with the base. At the lower portion of the opening in the one end of the body 2 through which the chute or funnel is inserted a ring or eye 13 is movably applied to portions of the interlaced wires 7 at said point and is adapted to be drawn through the meshes of the wires connected to the rim 8 of the chute or funnel above the lower portion of said rim to receive a removable spring-key 14, similar to the keys 12 heretofore set forth. The rim 8 is of greater diameter than that of the chute or funnel and bears against the end of the body around an opening therein for the chute or funnel and prevents the latter from tilting when it is applied.

The several parts of the improved trap may be readily connected, and when sent out from the factory or hands of the manufacturer similar parts will be nested to adapt a great number of traps to be packed or stored within a comparatively small space, with obvious economy in the cost of shipment as well as increase in number of the traps within a given space or inclosure.

Another mode of opening the trap and releasing the animal therefrom is to detach the keys in connection with the bottom of the same and permit the animal to fall directly from the body of the trap to the ground or into some destructive receptacle. This mode of releasing the animal from the trap will be preferred in most instances, though the removal of the chute or funnel, as before described, may also be effective in this operation. The improved trap is also strong and durable in its construction, and impairment of any part thereof to such an extent as to render it useless will not destroy the entire trap structure, as said part may be readily replaced.

Changes in the proportions and dimensions of the several parts of the trap may be resorted to without modifying the principle of the invention.

Having thus fully described the invention, what is claimed as new is—

1. A trap comprising a body, a bottom, and an entrance-chute, the lower terminals of the opposite sides of the body having loop devices loosely held thereby and adapted to be passed through meshes of the bottom, and removable keys passed through the loop devices of the body and disposed against under sides of the bottom and also through a portion of the body and arranged against the outer end of the chute, whereby the several parts of the trap may be quickly assembled or disassociated.

2. In a trap, the combination of a body having opposite loosely-depending rings at the bottom thereof, a bottom through which the rings are inserted, and removable keys inserted through the rings of the body and disposed against the under side of the bottom.

3. A trap comprising a body having a bottom attached thereto and an opening in one end, the body having rings at opposite sides thereof and at the lower portion of the opening, an entrance-chute removably mounted in the said opening and having a rim at its outer end, and keys removably inserted through the rings at the lower part of the body and at the lower portion of the margin of the said opening and adapted to bear against the under side of the bottom and the rim of the chute.

In testimony whereof I affix my signature in presence of two witnesses.

JOHN CAMPBELL, SR.

Witnesses:
GEO. G. MASON,
N. L. HENDEE.